UNITED STATES PATENT OFFICE.

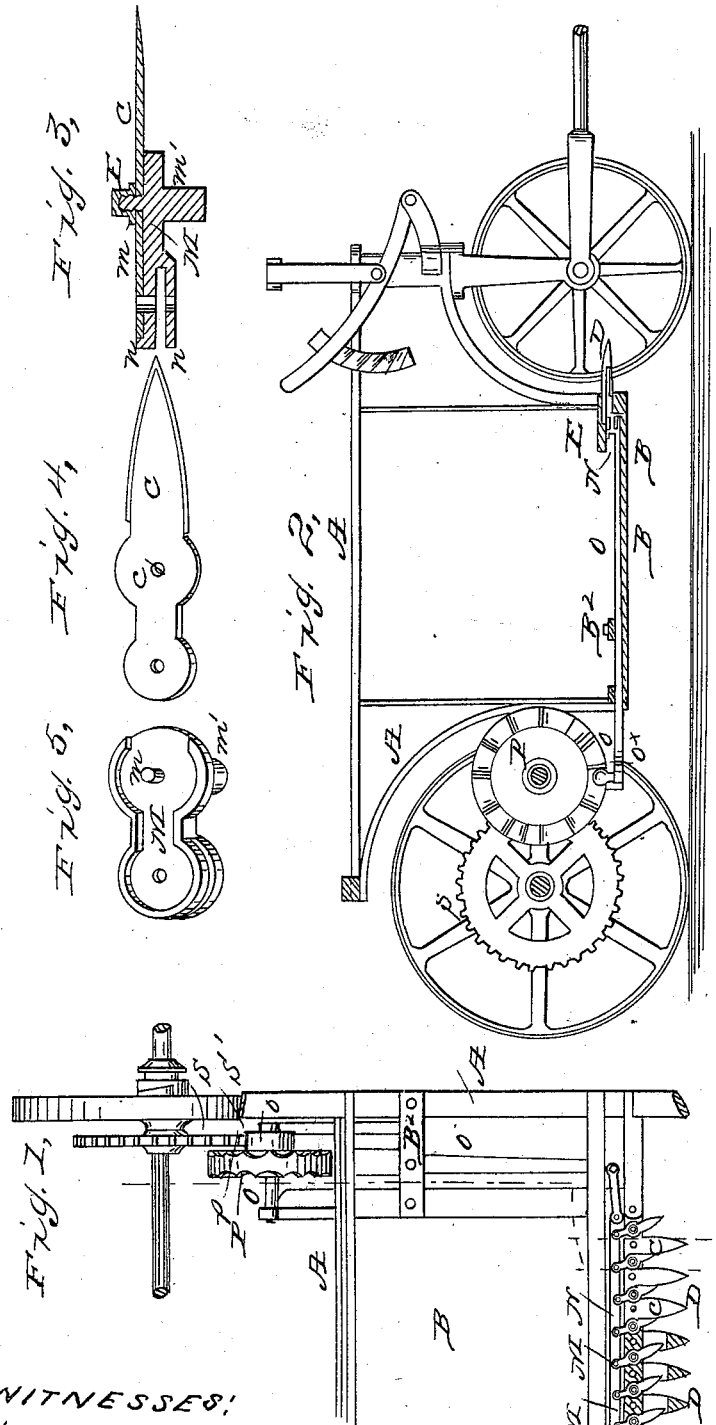

WILLIAM F. GOODWIN, OF WASHINGTON, DISTRICT OF COLUMBIA.

IMPROVEMENT IN HARVESTERS.

Specification forming part of Letters Patent No. 53,137, dated March 13, 1866.

*To all whom it may concern:*

Be it known that I, WILLIAM F. GOODWIN, of the city and county of Washington, in the District of Columbia, have invented a new and useful Improvement in Harvesters; and I do hereby declare the following to be a full, clear, and exact description of the nature, construction, and operation of the same, reference being had to the accompanying drawings, which are made a part of this specification, and in which—

Figure 1 is a plan of a portion of a harvester illustrating my invention. Fig. 2 is a sectional side elevation of the same. Fig. 3 is a longitudinal section through one of the teeth or cutters and its seat or casing. Fig. 4 is a perspective view of a tooth detached. Fig. 5 is a perspective view of the seat or casing for the tooth.

Similar letters of reference indicate corresponding parts in the several figures.

This invention relates to the construction and method of operating the cutting apparatus; and the principal feature of the improvement consists in providing each tooth of the cutting apparatus with a separate seat or casing, the entire series of which are pivoted independently to a reciprocating bar placed behind the cutters. Each tooth vibrates upon its independent pivot and is susceptible of removal for repair or replacement without disturbing the relation between the remaining teeth and the bar which operates them.

By my arrangement the teeth are capable of a very rapid vibration upon their independent pivots, which is believed to be better adapted for the cutting of the grain than the ordinary reciprocating movement.

In order that others skilled in the art to which my invention appertains may be enabled to fully understand and use the same, I will proceed to describe it in connection with the accompanying drawings.

In the accompanying drawings, A A may represent portions of the frame of a harvester, and B the platform. C C represent the cutters or teeth, which are formed and applied separately or independently of each other and vibrate between the fingers or guards D, which are constructed and attached in any suitable manner.

Each tooth or cutter, C, may be cut out of a sheet or plate of metal with a die, and at the same operation a hole, $c$, is made in it to receive a pivot, $m$, which is formed in one piece with a seat or casing, M, which incloses or partially embraces the rear portion of the tooth. The seat M and tooth C are therefore made separately, and the tooth is set into the seat with the pivot $m$ passing through the hole $c$ and projecting both above the tooth and below the seat. The upper portion of the pivot $m$ is threaded to adapt the seat and tooth to be securely clamped together by a nut, E.

It is manifest that this mode of connecting the two parts together enables the tooth to be readily detached from its seat, either for repair or replacement, when it becomes injured or broken.

The pivot $m'$ of each tooth has its bearing in the seat which rotates within the front bar, B′, of the platform-frame, said bar thus forming a substitute for the common finger-beam. The teeth and seats C M are covered and retained in place by a cap or plate, F, which, in Fig. 1, is represented as broken away to expose the devices beneath. This cap F receives the tops of the pivots $m$ and rests upon the guards. All the seats or casings M are pivoted to and vibrated by a reciprocating bar, M, which is jointed to a vibrating lever, O, which is pivoted to the bar B² and moved by the action of a wheel, P, upon the rollers $o\ o$, which are journaled upon small studs upon the opposite ends of the bar O′, which is secured upon the end of the lever O at right angles thereto. Each face of the wheel P has cam-projections or scallop-grooves $p$, the cam-surfaces acting upon the rollers $o\ o$, so as to throw the end of the lever O alternately in opposite directions. The rollers $o\ o$ are employed to avoid friction, and thus economize the power. Motion is transmitted from the axle to the wheel P through the gearing S S′.

Having thus described my invention, the following is what I claim as new therein and desire to secure by Letters Patent:

The flanged and journaled seats or casings M, provided with the projections $n\ n'$ and screw $m$, constituting receptacles for the teeth or cutters C, and admitting of the independent application and removal of the latter, as described.

WM. F. GOODWIN.

Witnesses:
OCTAVIUS KNIGHT,
C. A. PETTIT.